United States Patent
Freudiger et al.

(10) Patent No.: US 9,817,977 B2
(45) Date of Patent: Nov. 14, 2017

(54) METHODS FOR SELECTION OF COLLABORATORS FOR ONLINE THREAT MITIGATION

(71) Applicant: Palo Alto Research Center Incorporated, Palo Alto, CA (US)

(72) Inventors: Julien F. Freudiger, Mountain View, CA (US); Emiliano De Cristofaro, London (GB); Alejandro E. Brito, Mountain View, CA (US); Marshall W. Bern, San Carlos, CA (US); Ersin Uzun, Campbell, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 350 days.

(21) Appl. No.: 14/245,498

(22) Filed: Apr. 4, 2014

(65) Prior Publication Data
US 2015/0286824 A1    Oct. 8, 2015

(51) Int. Cl.
*H04L 29/06*    (2006.01)
*G06F 21/57*    (2013.01)

(52) U.S. Cl.
CPC .................... *G06F 21/577* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,526,603 | B2* | 9/2013 | Kerschbaum | H04L 9/008 380/30 |
| 9,158,925 | B2* | 10/2015 | Kamara | H04L 9/083 |
| 9,275,237 | B2* | 3/2016 | De Cristofaro | G06F 21/60 |
| 2009/0241166 | A1* | 9/2009 | Thurm et al. | 726/1 |
| 2010/0325214 | A1* | 12/2010 | Gupta | G06Q 10/10 709/206 |
| 2011/0161452 | A1* | 6/2011 | Poornachandran et al. | 709/207 |
| 2012/0233698 | A1* | 9/2012 | Watters et al. | 726/25 |
| 2014/0096188 | A1* | 4/2014 | Mont et al. | 726/1 |
| 2014/0136439 | A1* | 5/2014 | Galvin et al. | 705/321 |
| 2015/0149763 | A1* | 5/2015 | Kamara | H04L 9/083 713/150 |

* cited by examiner

*Primary Examiner* — Anthony Brown
*Assistant Examiner* — William Corum, Jr.
(74) *Attorney, Agent, or Firm* — Shun Yao; Park, Vaughan, Fleming & Dowler LLP

(57) ABSTRACT

One embodiment of the present invention provides a system for stable selection of collaborating partners for exchanging security data. During operation, the system receives vectors of collaboration values from a plurality of entities. A collaboration value is a measure of an expected benefit of collaborating with a respective entity. The system sorts each of the vectors by the collaboration values of the respective vector. The system then determines matching entities given a number of partners wanted by each organization in N. The system may add matching entities to lists of collaborating partners given the number of partners wanted by each organization in N. Subsequently, the system sends the lists of collaborating partners to facilitate exchanging security data with partners in the list of collaborating partners.

19 Claims, 9 Drawing Sheets

CENTRALIZED STABLE ASSIGNMENT

A ⇒ C  ← 604
B ⇒ F
C ⇒ B
D ⇒ E
E ⇒ C   C ⇏ A  ← 608
A ⇒ D
F ⇒ E   E ⇏ F
F ⇒ A 606 points to E ⇒ C

METHODS FOR SELECTION OF COLLABORATORS FOR ONLINE THREAT MITIGATION

RELATED APPLICATION

The subject matter of this application is related to the subject matter of the following application:
U.S. patent application Ser. No. 14/101,148, entitled "METHOD AND APPARATUS FOR PRIVACY AND TRUST ENHANCING SHARING OF DATA FOR COLLABORATIVE ANALYTICS," by inventors Emiliano De Cristofaro, Julien F. Freudiger, Ersin Uzun, Alejandro E. Brito, and Marshall W. Bern, filed Dec. 9, 2013;
the disclosure of which is incorporated by reference in its entirety herein.

BACKGROUND

Field

The present disclosure relates to private collaborative analytics. More specifically, this disclosure relates to a method and system that facilitates optimal selection of collaborating partners for organizations.

Related Art

Organizations today are exposed to an increasingly large number of cyber threats, including malware and software vulnerabilities as well as botnet, zeroday, and denial of service attacks. In compliance with risk management frameworks, industry practices usually recommend implementation of standard security countermeasures, such as firewalls, antivirus software, patch management, and security/log audits.

Some security solutions go beyond passive defense mechanisms and offer proactive measures to predict attackers' next move. Prediction techniques rely on attack information—so-called "security data"—that companies retain: Internet Protocol (IP) addresses, domains, Uniform Resource Locators (URLs), hostnames, vulnerabilities, phishing emails, metadata (e.g., attack technique, malware, activity description), incident parameters, Threats Techniques and Procedures (TTPs), etc. The more security data a company has, the better the understanding of adversarial strategies and thus the success of its prediction techniques.

Threat modeling requires as much information as possible about threats but information is usually scarce. In practice, companies have a limited view of malicious cyber activities and can only achieve limited prediction performance. Previous work showed that collaboration would curb this challenge as companies are often hit by the same attacks (see, e.g., Zhang, J. and Porras, P. and Ulrich, J. Highly Predictive Blacklisting. Proceedings of Usenix Security, 2008). Therefore, companies can enhance the accuracy of security intelligence and analytics mitigation techniques if companies share security data with each other, thereby increasing the availability of information about attacks.

Unfortunately, a number of problems often prevent companies from sharing security data. Companies may have different preferences regarding which partners they want to collaborate with, based on their expectations of benefiting from a collaborating relationship. For example, company X may want to share security data with company Y more than company Z because company X may expect a greater benefit from sharing security data with company Y than company Z. However, company Y might prefer to share data with company W more than company X. Each company wants to benefit from their collaborative relationships, but it is difficult for companies to determine among themselves which other companies to collaborate with. In some cases, companies might not wish to follow recommendations from a central authority, and pick collaborators that work best for them. Without an effective process for determining collaborating relationships to satisfy the companies' needs, the companies might not be able to benefit from collaborating and sharing security data.

SUMMARY

One embodiment of the present invention provides a system for stable selection of collaborating partners for exchanging security data. During operation, the system receives vectors of collaboration values from a plurality of entities. A collaboration value is a measure of an expected benefit of collaborating with a respective entity. The system sorts each of the vectors by the collaboration values of the respective vector. The system then determines matching entities given a number of partners wanted by each organization in N. The system may add matching entities to lists of collaborating partners given the number of partners wanted by each organization in N. Subsequently, the system sends the lists of collaborating partners to facilitate exchanging security data with partners in the list of collaborating partners.

In a variation on this embodiment, the system determines one or more matching entities for exchanging security data by solving max $c^T x$ for x, such that $Ax \leq b$, in which:

$x_i \in \{0,1\}, x=[x_i]$, for $i=1, \ldots, N$, $c=[1, \ldots, 1]$, $b=[k_1, \ldots, k_N]$, $A=[v_{i,j}]$ for $i=1, \ldots, N$ and $i=1, \ldots N$.

Note that c is a vector with all elements equal to the number 1, b is a vector containing the number of partners wanted by each organization in N organizations, A is a set of vectors containing collaboration values $v_{i,j}$ and x is a vector indicating a set of partners selected for a particular entity. The system then returns vector x to the plurality of entities.

In a variation on this embodiment, the system communicates instructions to all entities to perform distributed assignment. The entities each determine one or more matching entities for exchanging security data by solving max $\Sigma_{i=1}^{N} v_j x_i$ for $x_i$, such that $\Sigma_{i=1}^{N} x_i \leq k_1$, in which $x_i \in \{0,1\}$, $v_j$ is an element in a vector of collaboration values, x is a vector representing selected partnering entities, and $k_j$ is a target number of partners for each entity j. The solution involves sorting vector v in descending order, and selecting top $k_j$ entries of the sorted vector v to add to a list of collaborating organizations for the entity j.

In a variation on this embodiment, the system repeatedly adds partners to an entity's list of collaborating partners until the list of collaborating partners has reached a predetermined number of partners.

In a variation on this embodiment, the system removes a collaboration value of the matching entity from a vector of collaboration values after adding the matching entity to the list of collaborating partners.

In a variation on this embodiment, the system sends a corresponding list of collaborating partners to each entity of the plurality of entities.

BRIEF DESCRIPTION OF THE FIGURES

FIG. 6A-6C presents block diagrams illustrating an exemplary partner selection process, in accordance with an embodiment.

In the figures, like reference numerals refer to the same figure elements.

DETAILED DESCRIPTION

Figure 1:
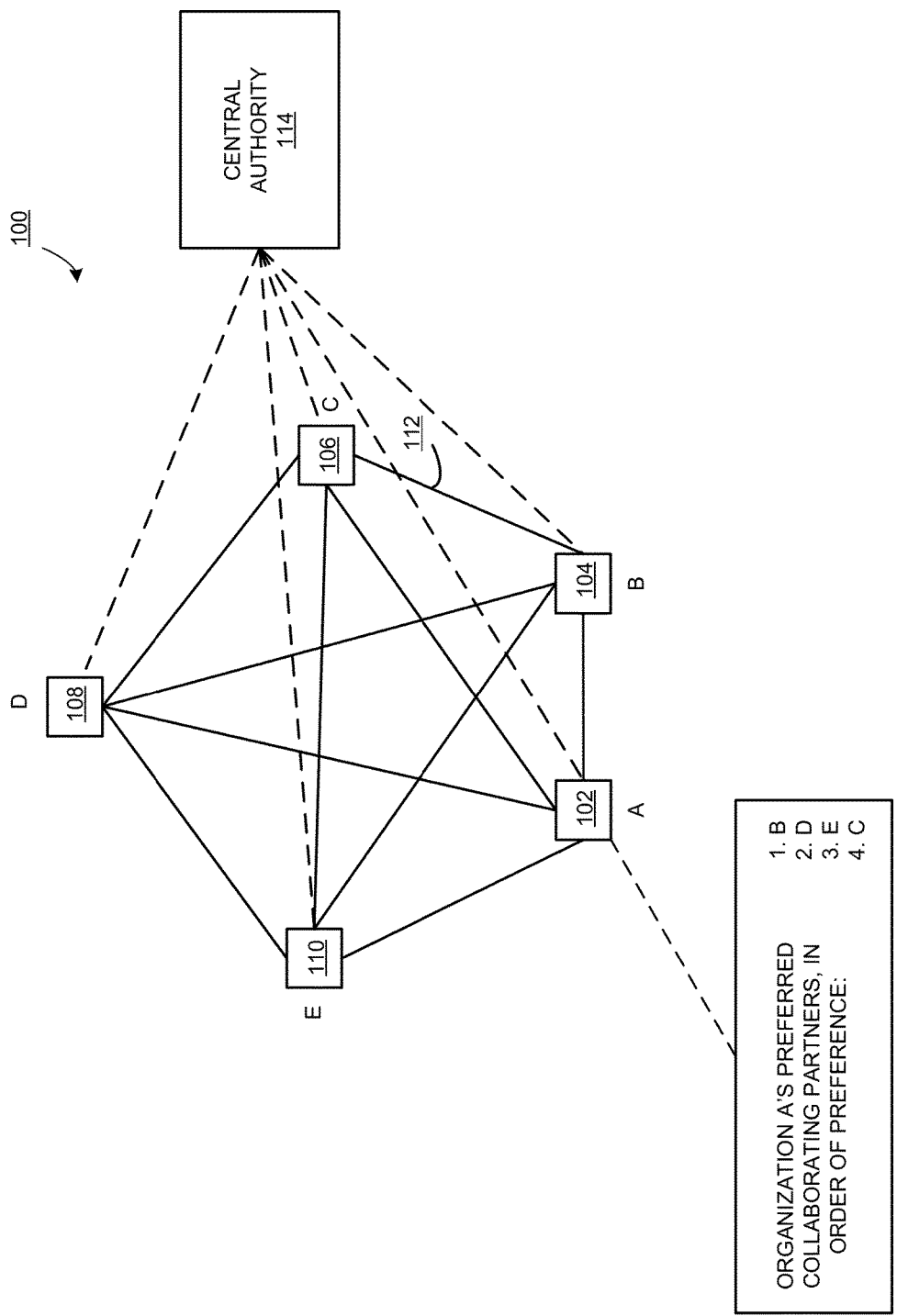
FIG. 1 presents a block diagram illustrating an exemplary context of a system for selection of collaborating partners, according to an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of selection of collaboration partners for network threat mitigation by assigning collaboration partners through a combination of privacy-preserving centralized and distributed techniques. A partner selection system as described herein may include a central authority that assigns collaboration partners to entities, such as organizations. The partner selection system also allows the organizations to choose collaboration partners among themselves using distributed techniques.

The system initially attempts to determine the partner assignments by having the central authority iteratively execute a stable matching technique to add individual partners to each organization's list of partners. If all the organizations reach their target number of partners, then the central authority returns a list of collaborators to each organization. However, if there is no match to be found, the system can apply a centralized assignment process and/or a distributed assignment process.

With the centralized assignment process, the central authority attempts to solve max $c^T x$ such that $Ax \leq b$ for the value of vector x. $c^T$ is the transpose of a vector c, and c is a vector with all elements equal to the number 1. b is a vector with elements representing the number of partners wanted by each organization. A is a matrix (e.g., a set of vectors containing collaboration values), and x is a vector indicating a set of collaborating partners for an organization. Solving for vector x maximizes the number of partners, subject to the constraint of the target number of partners $k_j$ for each organization. If the central authority cannot find the target number of partners for one or more organizations, then the system can perform a distributed assignment process.

With the distributed assignment process, each of the organizations attempts to solve max $\Sigma_{i=1}^{N} v_i x_i$ such that $\Sigma_{i=1}^{N} x_i \leq k_j$ where $x_i \in \{0,1\}$, $k_j$ is a target or maximum number of partners for organization j, and $v_i$ represents collaboration values. A collaboration value $v_i$ is a measure of an expected benefit of collaborating with a respective organization $c_i$. Note that $x_i$ is a binary value that indicates whether an organization $c_i$ is a collaboration partner for the organization. An organization j may sort collaboration values of the other organizations and choose the top $k_j$ sort entries to determine a list of collaborating organizations.

Note that the techniques discussed herein are related to a broader framework for privacy-preserving secure collaboration and data sharing as disclosed in U.S. patent application Ser. No. 14/101,148, titled "Method And Apparatus For Privacy And Trust Enhancing Sharing Of Data For Collaborative Analytics," the disclosure of which is incorporated herein in its entirety. U.S. patent application Ser. No. 14/101,148 discloses techniques to facilitate establishment of trust through privacy-preserving identification of sharing partners in real-time, and reduces competitive risk through controlled and limited data sharing. This disclosure adds to the techniques that organizations may use to facilitate data sharing and mitigate online threats.

This disclosure focuses on the selection of partners after similarities are computed in a privacy-preserving way. In the disclosed framework, each organization may pick their top five partners and assume every organization agrees to collaborate with whichever party requests it. In reality, some organizations might refuse to collaborate with other organizations, as they have better options, which complicates the issue. This disclosure solves this problem by describing locally optimal and globally optimal assignments, as well as a distributed technique that guarantees assignment.

Figure 2:
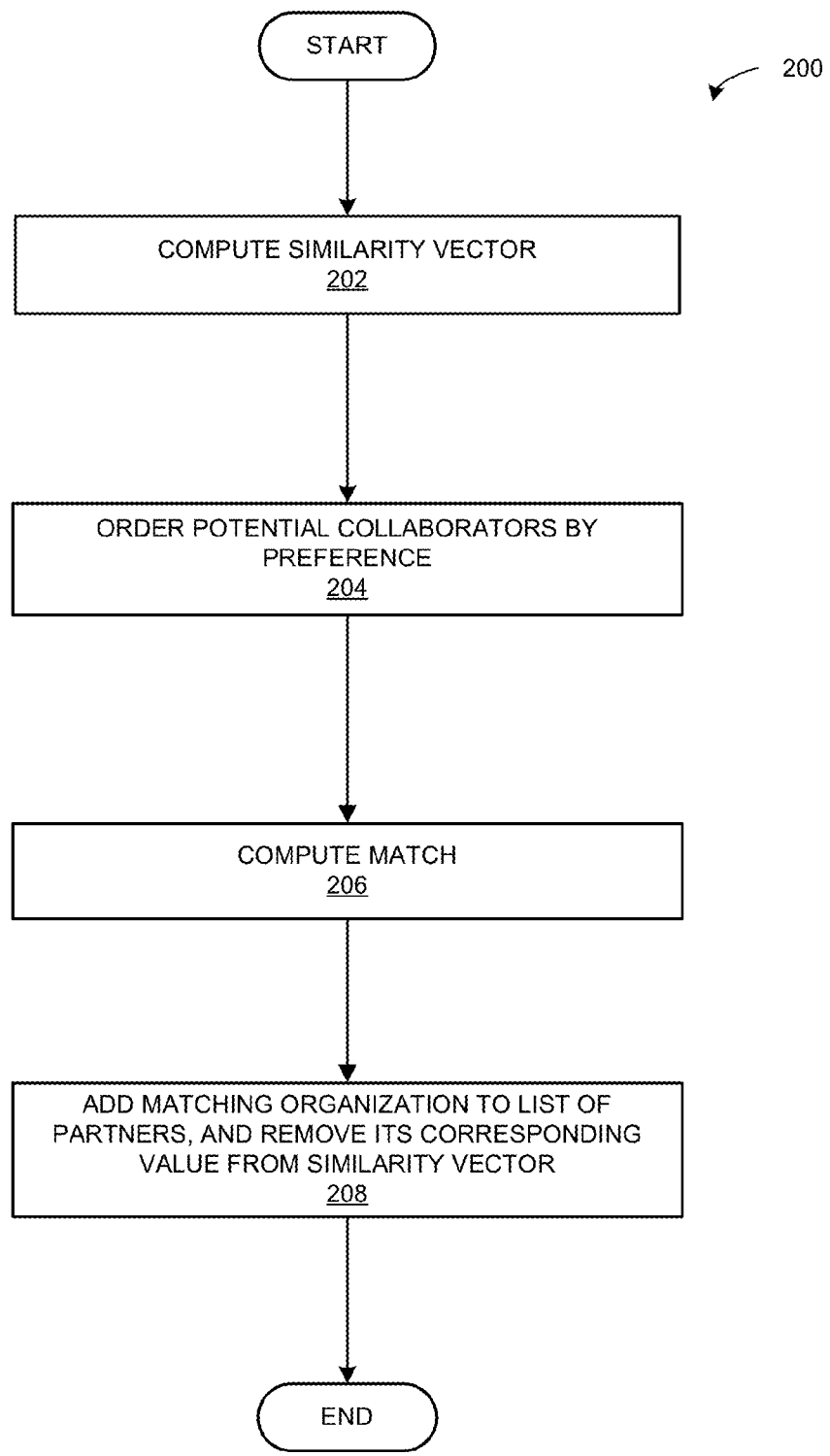
FIG. 2 presents a flowchart illustrating an exemplary process for selecting a collaborating partner, according to an embodiment.
Figure 3:
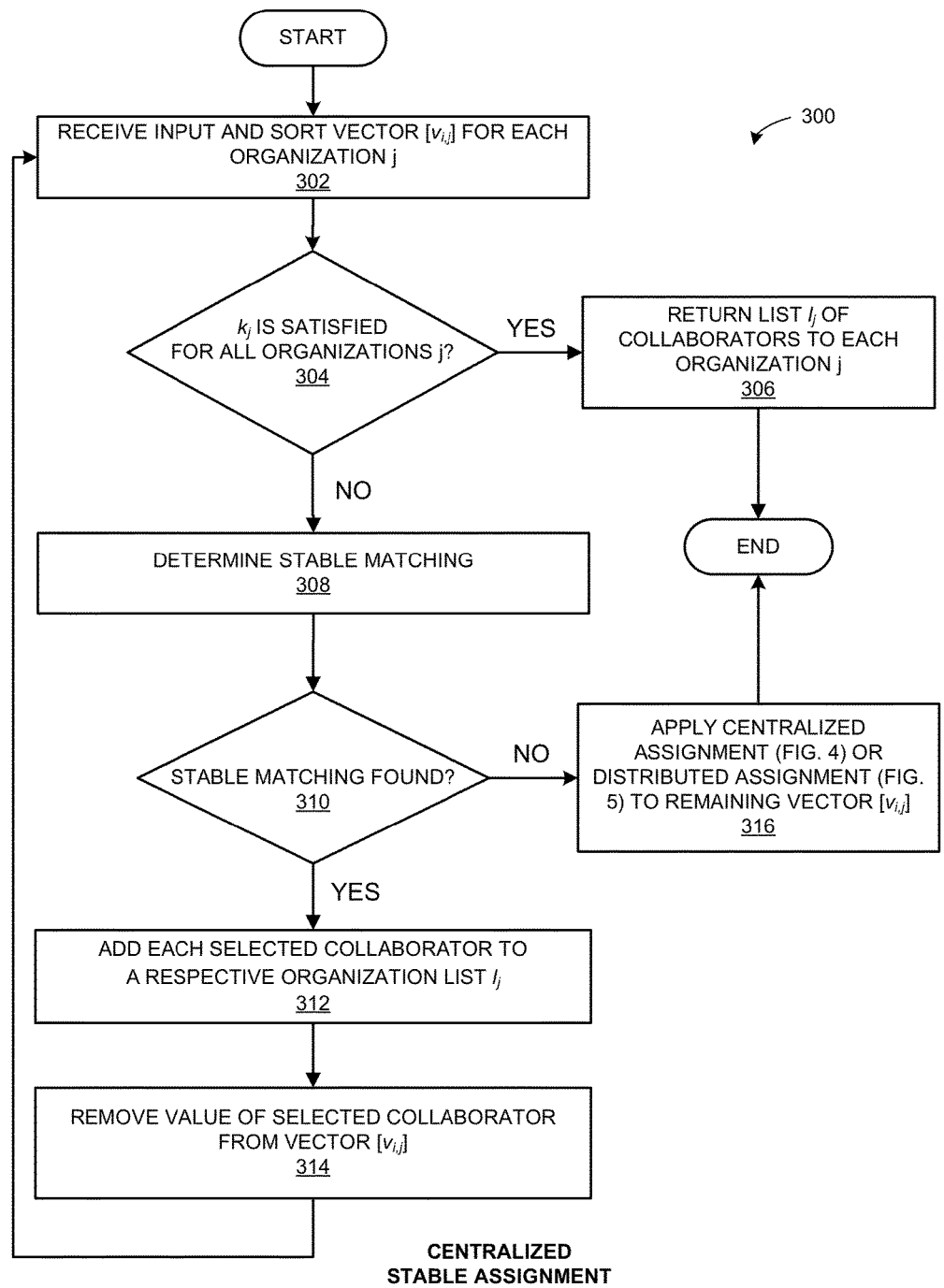
FIG. 3 presents a flowchart illustrating another exemplary process for selection of collaborating partners, according to an embodiment.
Figure 4:
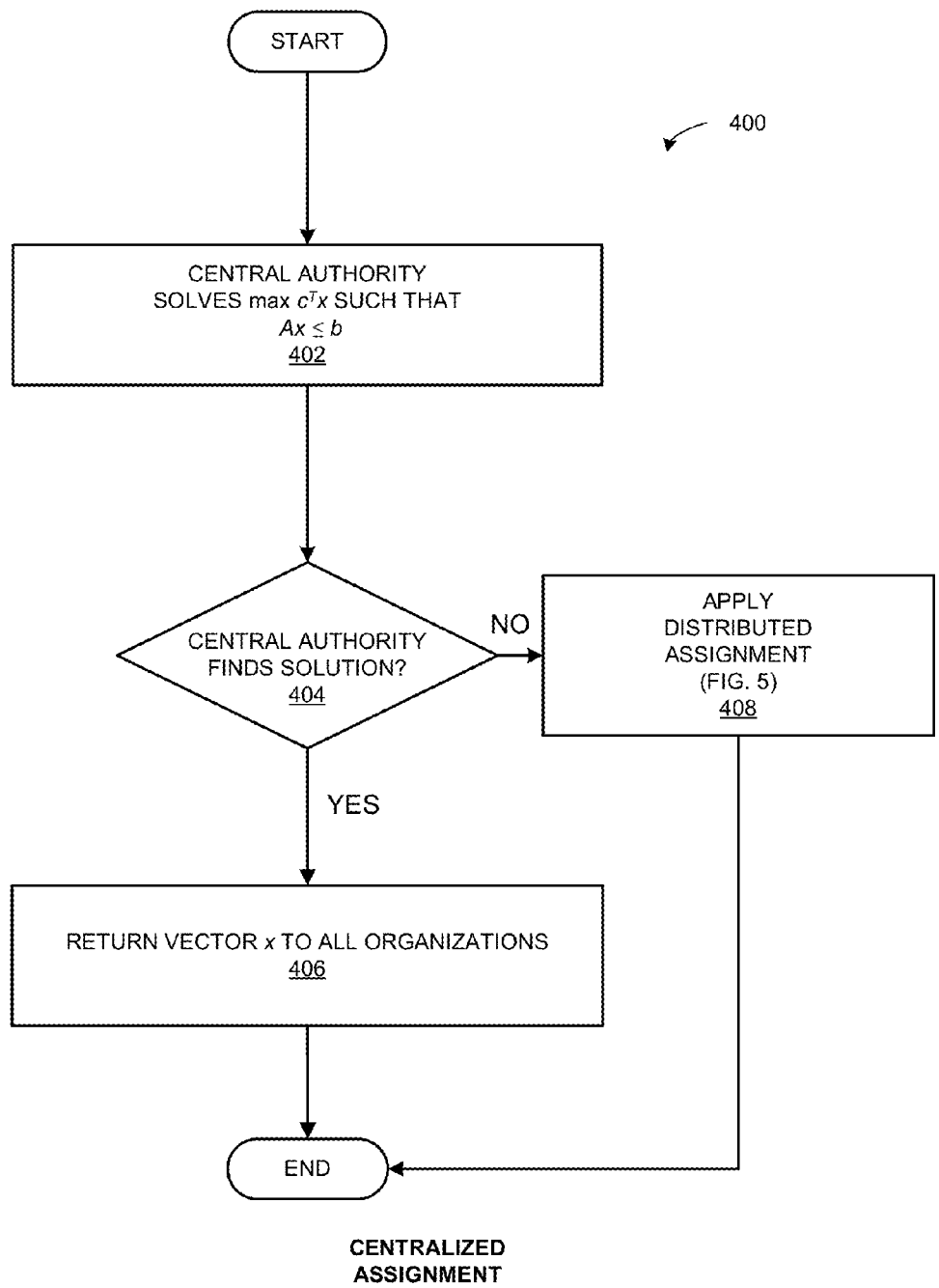
FIG. 4 presents a flowchart illustrating an exemplary process for centralized assignment of collaborating partners, according to an embodiment.
Figure 5:
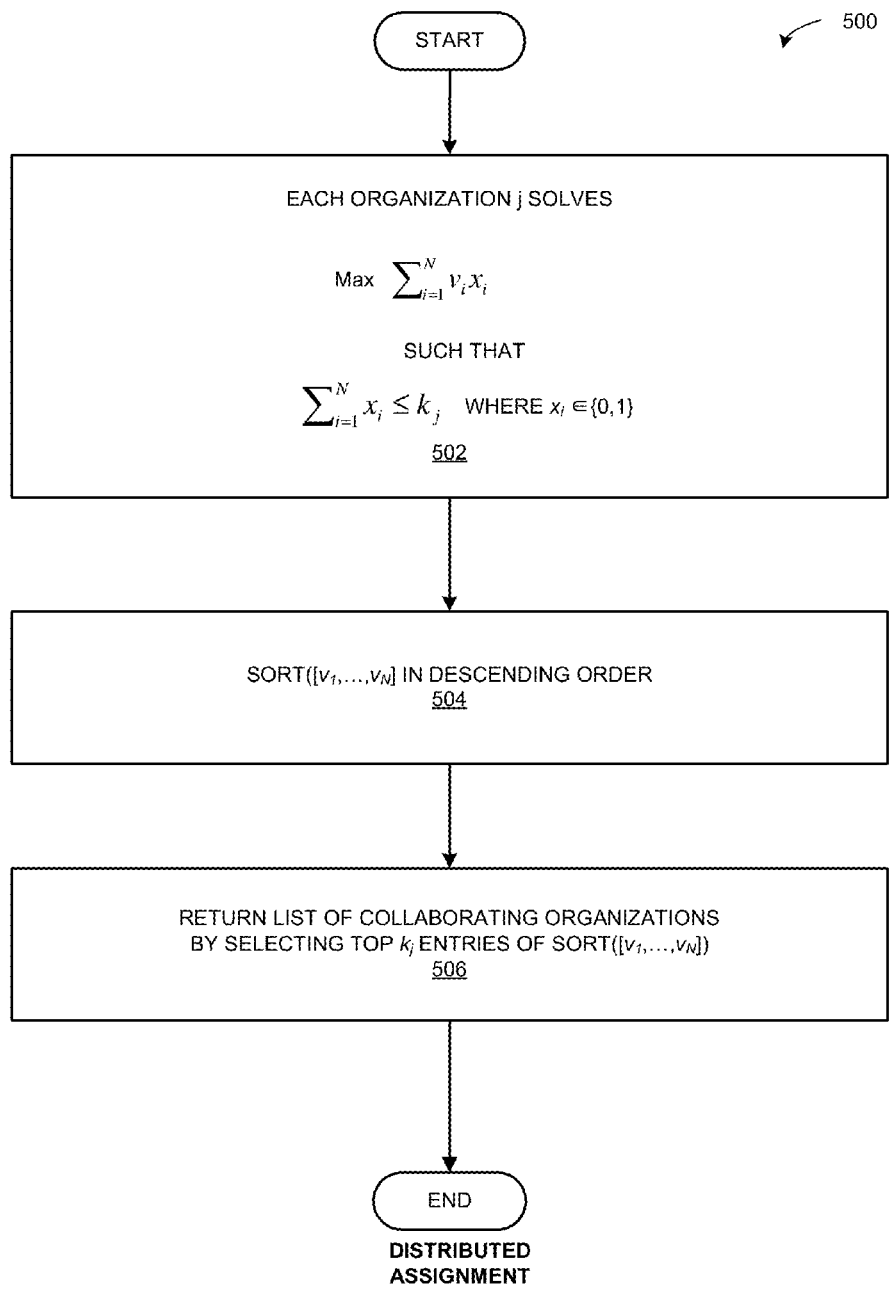
FIG. 5 presents a flowchart illustrating an exemplary process for distributed assignment of collaborating partners, according to an embodiment.
Figure 7:
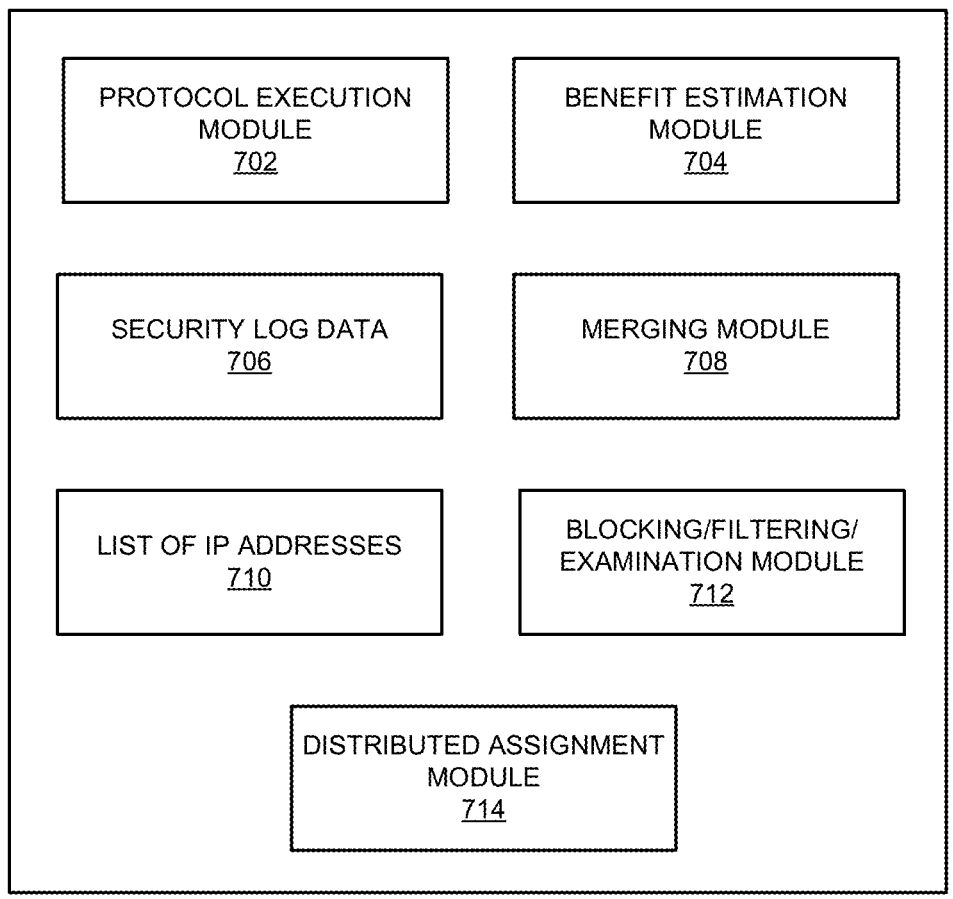
FIG. 7 presents a block diagram illustrating an exemplary apparatus for selection of collaborating partners, in accordance with an embodiment.
Figure 8:
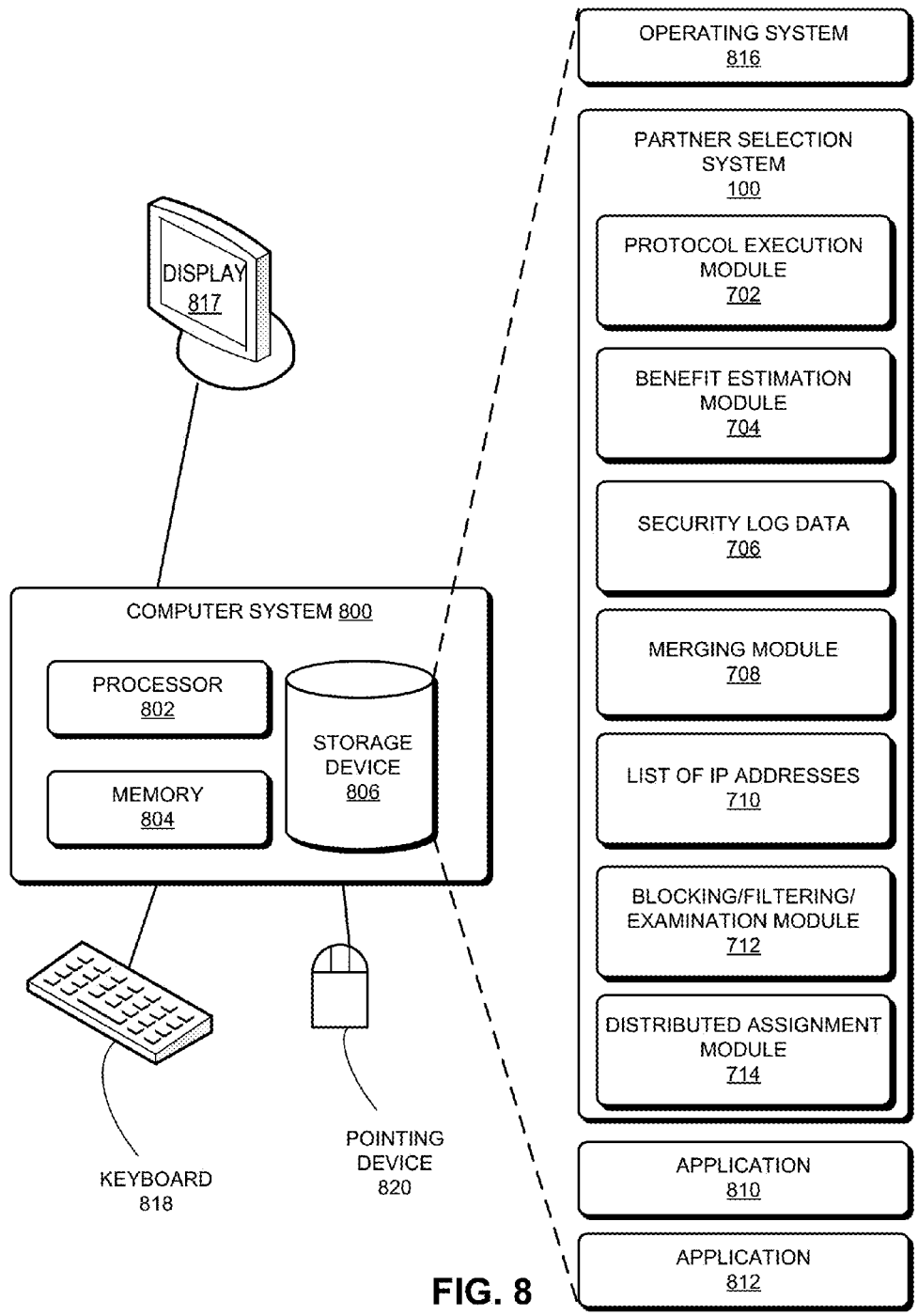
FIG. 8 illustrates an exemplary computer system that facilitates selection of collaborating partners, in accordance with an embodiment.
Figure 9:
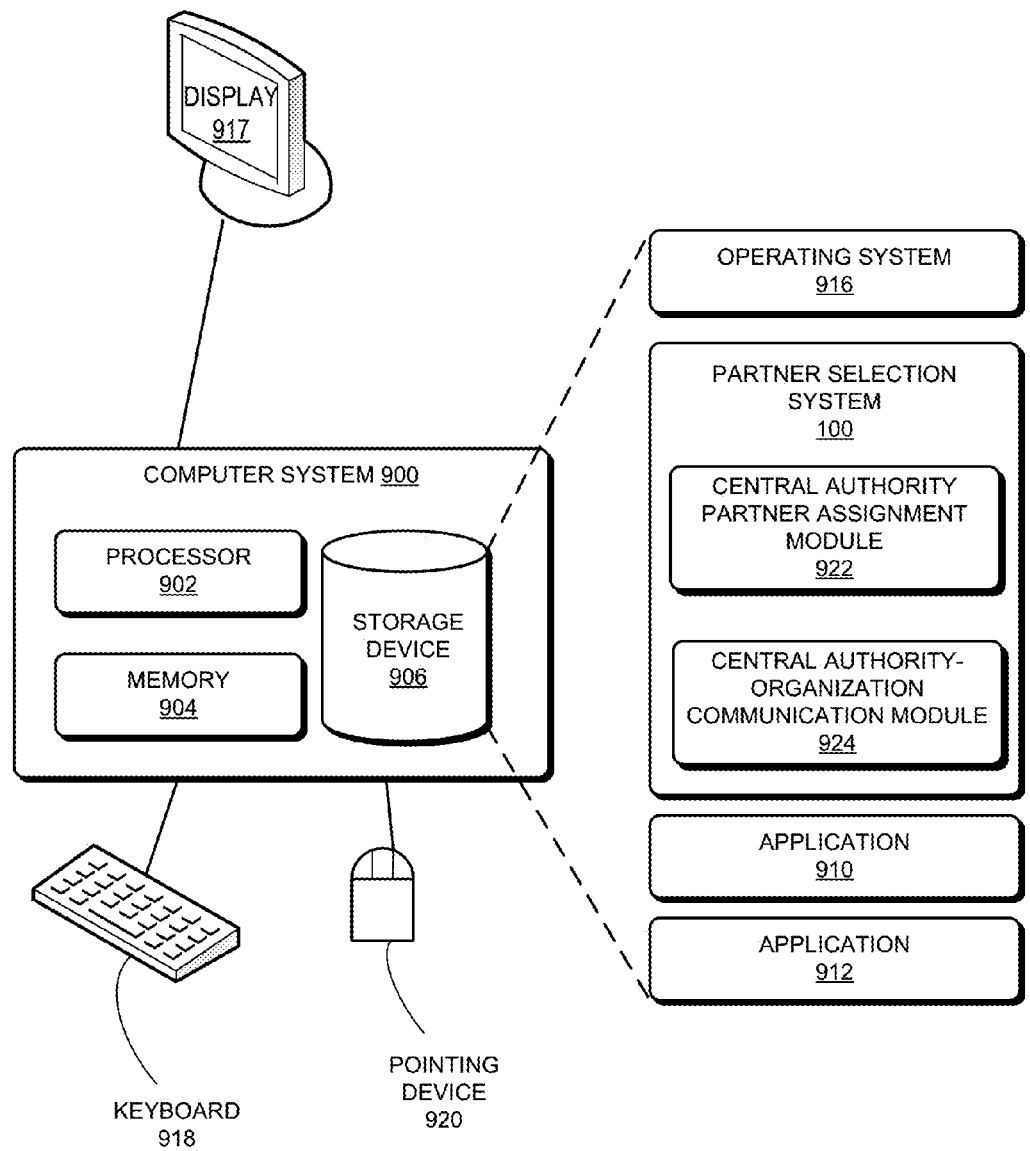
FIG. 9 illustrates an exemplary computer system for a central authority that facilitates selection of collaborating partners, in accordance with an embodiment.

In the disclosure below, FIG. 1 presents a block diagram illustrating an exemplary context of a system for selection of collaborating partners. FIG. 2 presents a flowchart illustrating an exemplary process for selecting a collaborating partner. FIG. 3 presents a flowchart illustrating another exemplary process for selection of collaborating partners. FIG. 4 presents a flowchart illustrating an exemplary process for centralized assignment of collaborating partners. FIG. 5 presents a flowchart illustrating an exemplary process for distributed assignment of collaborating partners. FIG. 6A-6C presents block diagrams illustrating an exemplary partner selection process. FIG. 7 presents a block diagram illustrating an exemplary apparatus for selection of collaborating partners. FIG. 8 illustrates an exemplary computer system that facilitates selection of collaborating partners, and FIG. 9 illustrates an exemplary computer system for a central authority that facilitates selection of collaborating partners.

System Architecture

FIG. 1 presents a block diagram illustrating an exemplary context of a system for selection of collaborating partners, according to an embodiment. As depicted in FIG. 1, a context in which a partner selection system 100 operates may include organizations (e.g., organizations A-E 102-110) that may choose to share security data with each other. The lines connecting the organizations indicate that the organizations may collaborate with each other. For example, line 112 indicates that organization B may potentially collaborate with organization C. There is a centralized arbitrator, central authority 114, to manage the process of matching organizations with their most preferred partners. In some implementations, each organization may individually execute a protocol that allows the organization to match up with its most preferred partners, which are the partners that provide the greatest benefit.

The organizations each want to collaborate with their most preferred partners, but the organizations' preferred partners might not reciprocate their collaboration proposals. For example, even if organization A 102 considers organization B 104 to be a most preferred partner, organization B 104 might not consider organization A 102 as a most preferred partner. Organization B 104 might consider organization D 108 to be the most preferred partner, and organization A 102 may rank at the bottom of the preference list for organization B 104.

These organizations choose collaborating partners in a selective manner. The organizations each prefer to collaborate with other organizations that can benefit them the most. The organizations can compute the expected benefit of collaborating with each other according to some agreed-upon metric. For example, organization A 102 can compute the expected benefit of collaborating with each of organizations B 104 to E 110, and organization B 104 can compute the expected benefit of collaborating with organization A 102 and each of organizations C 106 to E 110.

Each organization in a set of N organizations generates an ordered list of other organizations that it wants to collaborate with. The set of N organizations can be represented as $C=\{c_1, \ldots, c_N\}$. The ordered list is also called a preference list. An organization may rank other organizations by the expected benefits of collaboration. This collaboration can involve exchanging security data. Each organization has its own data set, and the organizations seek to obtain the most benefits from sharing their security data. An organization may estimate the expected benefit of collaboration using techniques as described in U.S. patent application Ser. No. 14/101,148, titled "Method And Apparatus For Privacy And Trust Enhancing Sharing Of Data For Collaborative Analytics," the disclosure of which is incorporated herein in its entirety. Techniques for centralized computation of vectors of expected benefits are described in U.S. patent application Ser. No. 14/245,778, titled "Methods for Centralized Privacy-Preserving Collaborative Threat Mitigation."

The organizations each generate a preference list of their preferred collaborating partners according to the expected benefits. For example, organization A 102 may estimate the benefits of collaborating with organizations B 104, C 106, D 108, and E 110. Organization A 102 may determine that its preference list includes organizations B 104, D 108, E 110, and C 106, in order of preference. That is, organization A 102 prefers to collaborate with organization B 104 the most because organization A 102 estimates that collaborating with organization B 104 provides the most expected benefit. Finally, each organization $c_j$ may determine with how many $k_j$ other organizations it intends to collaborate with.

Organization A 102 may collaborate with other organizations to exchange data such as security log data, including data describing malicious attacks. Security log data is data stored in a log that describes network security-related activity, such as network attacks. The security logs may store data describing intrusion detection events or other network attacks by malicious attackers and/or data describing any other security-related events from any IP address. This information may include IP addresses of malicious attackers.

To improve their respective network security, the organizations may utilize the techniques discussed herein to find collaborating partners and share the security log data with each other in real-time. The organizations may share security data to improve and/or update the detection and prediction of network threats and/or to gain a better understanding of past or present attacks, and/or to improve any other network security measures.

Note that each of the organizations may deploy an internal network that includes a router and a plurality of computers. The organizations' routers may share security log data with each other over a network. The organizations may share their security log data with each other through their respective routers, although different implementations may utilize different types of devices to share security log data. Also, the one or more devices implementing the techniques disclosed herein may also be referred to as the system. Besides routers exchanging security log data, embodiments of the present invention may utilize any computers and/or other machines to exchange threat information.

Any number of organizations or parties can select partners for exchanging data using the techniques disclosed herein. Some organizations may run their software as cloud applications. For these organizations, a cloud node can collect threat information and share the information with other organizations.

Selection of Collaborating Partners

FIG. 2 presents a flowchart illustrating an exemplary process for selecting a collaborating partner, according to an embodiment. FIG. 2 and the accompanying text describe one process for matching an organization with collaboration partners. FIGS. 3, 4, and 5 and the accompanying text describe other possible implementations for selection of collaboration partners. The text below describes the process as performed by organization A 102, but all the organizations perform the same process.

During operation, organization A 102 may initially compute a similarity vector containing collaboration values (operation 202). For each potential collaborator $c_i$, organization A 102 determines the collaboration value $v_i$ (e.g., expected benefit) of collaborating with that organization. Organization A 102 may estimate the expected benefits by using techniques described in U.S. patent application Ser. No. 14/101,148, titled "Method And Apparatus For Privacy And Trust Enhancing Sharing Of Data For Collaborative Analytics," the disclosure of which is incorporated herein in its entirety. Organization A 102 can analyze, for example, an intersection of data sets, a size of intersection of data sets, a size of a union of data sets, or a Jaccard index value to determine the expected benefit of collaborating with a potential partner.

Organization A 102 next orders potential collaborators by preference to generate a preference list (operation 204). For example, organization A 102 may order the other organizations from highest collaboration value v to lowest collaboration value v. Organization A 102 then computes a match for a collaborating partner (operation 206). With a stable match, organization A 102 has no incentive to change collaborating partners. Organization A 102 may use any centralized or distributed techniques to determine the match.

Organization A 102 adds the collaborating partner to its list (operation 208). Organization A 102 may remove the collaborating partner's corresponding value from the similarity vector $v_i, \ldots, v_n$ and may also remove the collaborating partner from the preference list.

Exemplary Selection of Collaborating Partners

FIG. 3 presents a flowchart illustrating another exemplary process for selection of collaborating partners, according to an embodiment. FIG. 3 illustrates one possible implementation, and specific details may vary according to implementation. In the flowchart of FIG. 3, central authority 114 determines a stable assignment by iteratively finding matching partners. A stable assignment or stable matching means that parties have no incentive to disagree from a recommended matching.

As illustrated in FIG. 3, central authority 114 repeatedly executes a process to find matching partners. In some implementations, this process can be an implementation of Irving's algorithm for stable roommate matching as understood to those skilled in the art. This process can find a partner for an organization, if such a partner exists. If there is a solution, the central authority 114 shares it with all organizations. If there is no solution, the central authority 114 instructs organizations to use centralized assignment (FIG. 4) or distributed assignment (FIG. 5). The output of the process of FIG. 3 is a list $l_j$ of $k_j$ collaborators for each organization j, and this is a locally optimal solution.

During operation, central authority 114 may initially receive input data and sort a vector $[v_{i,j}]$ for each organization j (operation 302). Central authority 114 may receive data including a number of organizations N, collaboration values ($v_{i,j}$, i=1, ..., N) for each organization j, and a number of sought collaborating partners $k_j$ for each organization j. Note that each organization computes its vector of collaboration values, its desired number of collaborators, and shares this information with the central authority 114. Central authority 114 may sort a vector $[v_{i,j}]$ for each organization j. In one implementation, the sorted collaboration values indicate, for an organization j, the expected benefits of collaborating with other organizations in descending order.

If $k_j$ is satisfied for all organizations j (operation 304), then central authority 114 returns list $l_j$ of collaborators to each organization j (operation 306). This means that all the organizations have found the number of collaborating partners they wanted or there are no more partners to be found. Otherwise, central authority 114 continues with operation 308.

Next, central authority 114 determines a stable matching (operation 308). Central authority 114 may execute a process to find a matching partner for each organization, if there is such a matching partner. If central authority 114 finds a stable matching for an organization j (operation 310), then central authority 114 adds a collaborator to a respective organization list $l_j$ associated with organization j (operation 312). Central authority 114 then removes the collaboration value of the selected collaborator from vector $[v_{i,j}]$ (operation 314), and continues with operation 302. Note that removing the collaboration value prevents repeating an assignment with the same partner. Also, subsequent iterations of operation 302 do not require receiving input data such as the number of organizations, etc.

If central authority 114 does not find a stable matching, then central authority 114 may apply a centralized assignment process or a distributed assignment process to the remaining vector $[v_{i,j}]$ (operation 316). Note that central authority 114 does not find a stable matching when it does not find a match for all entities. A greedy version of this method is possible. For example, central authority 114 may initially find stable matches for 2 out of 10 organizations, and 8 organizations have no stable matches. On the next iteration, central authority 114 finds no additional matches for the 10 organizations, and central authority 114 then applies the centralized assignment process or the distributed assignment process.

The centralized assignment process is illustrated in FIG. 4, and the distributed assignment process is illustrated in FIG. 5. In some implementations, central authority 114 may apply the centralized assignment process, and the centralized assignment process applies the distributed assignment process. In some implementations, central authority 114 may bypass the centralized assignment process and directly apply the distributed assignment process.

Centralized Assignment of Collaborating Partners

FIG. 4 presents a flowchart illustrating an exemplary process for centralized assignment of collaborating partners, according to an embodiment. In one implementation, central authority 114 may perform the operations depicted in FIG. 4 during operation 312 of FIG. 3. Each organization computes its vector of collaboration values (in one embodiment this is performed in a privacy-preserving way), its desired number of collaborators, and shares this with central authority 114. Central authority 114 receives data including number of organizations N, collaboration values ($v_{i,j}$, i=1, ..., N) for each organization j, and a number of sought collaborating partners $k_j$ for each organization j.

The central authority 114 determines an assignment by solving an associated integer linear program. If there is a solution, central authority 114 shares it with all parties. If there is no solution, the central authority 114 informs organizations to use the distributed assignment process illustrated in FIG. 5. That is, if the centralized assignment process does not produce a solution, system 100 may fall back to the distributed assignment process illustrated in FIG. 5.

The output from the process of FIG. 4 is a binary vector x defining the organizations selected, with 1 meaning that the organization is selected and 0 meaning that the organization is not selected. This process assumes the organizations respect the decision of the central authority 114 and produces a globally optimal solution.

During operation, central authority 114 may solve max $c^T x$ such that $Ax \le b$ (operation 402), and:

$x_i \in \{0,1\}, x=[x_i]$, for i=1, ..., N
c=[1, ..., 1],
b=[$k_1$, ..., $k_N$],
A=[$v_{i,j}$] for i=1, ..., N and j=1, ..., N Note that $c^T$ is the transpose of vector c, and c is a vector with all elements equal to the number 1. b is a vector with elements representing the number of partners wanted by each organization. A is a matrix (e.g., set of vectors containing collaboration values), and x is a vector indicating a set of partners selected for an organization. Central authority 114 may utilize an appropriate technique to solve for vector x. Solving for vector x maximizes the number of partners, subject to the constraint of the target number of partners $k_j$ for each organization. For example, central authority 114 may execute a cutting-plane method, branch and bound method, or branch and cut method. The cutting-plane method solves integer linear optimization problems. Branch and bound is a method for finding optimal solutions of optimization problems, and can be used for solving integer and discrete programming problems. Branch and cut is a method of combinatorial optimization for solving linear programming problems where some or all the unknowns are integers.

If central authority 114 finds a solution (operation 404), then central authority 114 returns a vector x to all organizations (operation 406). Note that vector x for an organization j is semantically equivalent to a list $l_j$ indicating collaborating partners for organization j, and system 100 can transform vector x to the list $l_j$. For example, if a vector x={1, 0, 1, 1}, then system 100 can transform vector x to list $l_j$={A, C, D}.

If central authority 114 fails to find a solution, then system 100 applies the distributed assignment process (operation 408). In some implementations, central authority 114 sends an instruction to the organizations to apply the distributed assignment process. Central authority 114 fails if $\Sigma_{i=1}^{N} x_i < T$, where T is a performance threshold (e.g., minimum member of collaborators) determined by central authority 114 or by the organizations. The distributed assignment process is illustrated in FIG. 5.

Distributed Assignment of Collaborating Partners

FIG. 5 presents a flowchart illustrating an exemplary process for distributed assignment of collaborating partners, according to an embodiment. In one implementation, each of organizations 102-110 may perform the operations depicted in FIG. 5, either during operation 312 of FIG. 3 or during operation 408 of FIG. 4. The input to the process of FIG. 5 includes a number of organizations N, collaboration values ($v_i$, i=1, . . . , N) for each organization j, and a number of sought collaborating partners $k_j$ for each organization j. The output from the process of FIG. 5 is a list of integers defining the organizations selected. This process does not require a central authority because the organizations perform the computations in a distributed fashion. Each organization has control over the number of collaborators they need. Implementation can be very efficient and the process scales very well.

Each organization computes its vector of collaboration values (in one embodiment this is performed in a privacy-preserving way), its desired number of collaborators, and selects collaborators that maximize the sum of collaboration values. This involves solving an integer linear program. This process assumes the organizations are generous and will collaborate with whichever other organization requests collaboration. Note that the distributed assignment process is guaranteed to always generate an assignment for the organizations.

During operation, each organization j may solve max $\Sigma_{i=1}^{N} v_i x_i$ such that $\Sigma_{i=1}^{N} x_i \leq k_j$ where $x_i \in \{0,1\}$ (operation 502). $v_i$ is an element in a vector of collaboration values. Organization j may utilize one of a number of techniques to solve for vector x. For example, organization j may use a knapsack method to solve for vector x. Knapsack methods can solve combinatorial optimization problems, typically involving resource allocation with constraints. Organization j may sort $[v_1, \ldots, v_N]$ in descending order (operation 504). Organization j then returns a list of collaborating organizations by selecting the top $k_j$ entries of sort($[v_1, \ldots, v_N]$) (operation 506).

Exemplary Partner Selection Process

FIG. 6A-6C presents block diagrams illustrating an exemplary stable partner selection process, in accordance with an embodiment. FIG. 6A-6C depicts some examples of preference lists, proposals, and rejections. Note that the organizations 102-110 may repeatedly run the depicted partner assignment process multiple times, each run assigning at most one partner to each organization. Central authority 114 may execute an analogous process to find collaborating partners.

FIG. 6A depicts six organizations and their preference lists. For example, a preference list 602 for organization A includes organizations C, D, B, F, and E. The preference lists are depicted in ranking order, with the most preferred collaborating partner on the far left, and the least preferred collaborating partner on the far right. For example, the most preferred collaborating partner for organization A is organization C, and the least preferred collaborating partner is organization E.

FIG. 6B depicts proposals and rejections that one organization sends to another. The right arrow indicates that one organization is sending a collaboration proposal to another. The right arrow with the slash indicates that an organization rejects another organization's proposal. For example, organization A sends a collaboration proposal 604 to organization C. Organization E sends a proposal 606 to organization C, and organization C sends a rejection message 608 to organization A. This is usually executed within a central server.

FIG. 6C depicts the state of the preference lists after sending and receiving the proposals and rejections of FIG. 6B. Some of the changes to the preference lists depicted in FIG. 6C include organization A removing organization C from preference list 610 since organization C rejected organization A. Also, organization A removes organization E from preference list 610 since organization A received an offer from organization F.

The possible states for the preference lists include:
(1) The preference list includes a single organization. For this outcome there is a stable match for the organization owning the preference list.
(2) The preference list is empty. For this outcome the organization owning the preference list has no stable match.
(3) The preference list contains more than a single organization. The organization owning the preference list continues to send and receive proposals and rejections until the preference list is either empty or has a single organization.

When all the lists have either a single organization or no organization, then the process may go to a second phase before it terminates. The central authority 114 and/or organizations 102-110 adds the respective partners (if any) to the respective lists, and can repeat with a new run to add additional partners.

Exemplary Apparatus

FIG. 7 presents a block diagram illustrating an exemplary apparatus 700 for selection of collaborating partners, in accordance with an embodiment. Organizations 102-110 may utilize an apparatus similar to the apparatus depicted in FIG. 7. The techniques for selecting partners, estimating benefits, sharing data, and other processes may be implemented in a router, switch, specialized computer system, or some other telecommunication device or machine. Apparatus 700 can be an example of a router or other network device implementing the disclosed techniques.

Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices.

Specifically, apparatus 700 can comprise a protocol execution module 702, a benefit estimation module 704, security log data 706, a merging module 708, a list of IP addresses 710, a blocking/filtering/examination module 712, and a distributed assignment module 714. Note that apparatus 700 may also include additional modules and data not depicted in FIG. 7, and different implementations may arrange functionality according to a different set of modules. Embodiments of the present invention are not limited to any particular arrangement of modules.

Protocol execution module 702 executes processes associated with a protocol for distributed selection of partners. Benefit estimation module 704 estimates the benefit of collaborating with another organization. Security log data 706 stores data describing security events, such as malicious attacks from IP addresses. Merging module 708 merges security log data with other collaborating organizations. List of IP addresses 710 stores the IP addresses of routers or other devices of other organizations to enable sharing and merging of security log data. Blocking/filtering/examination module 712 may block/filter/examine traffic coming from IP addresses that are deemed to be suspicious based on merged data. Blocking/filtering/examination module 712 may store a blacklist of IP addresses. Distributed assignment module 714 executes the process illustrated in FIG. 5.

Some implementations may integrate the disclosed techniques in a firewall, and the firewall may be part of a router or other network appliance. The router may automatically execute the processes disclosed herein. Some organizations may also integrate the techniques on a server dedicated to storing the security log and exchanging security log data with other organizations.

Some organizations may implement the techniques disclosed herein in backbone routers. This can, for example, improve the effectiveness of measures to stop distributed denial-of-service attacks, which may include blocking network attacks before they reach a core router.

An administrator can turn on security log sharing features on the router, network appliance, or server to automatically execute the disclosed techniques. The administrator can also log onto a device and configure the stored IP addresses of other organizations' routers or other devices that implement the techniques disclosed herein. The devices can then communicate with the other organizations' devices to partner and merge security log data.

Exemplary Computer System

FIG. 8 illustrates an exemplary computer system 800 that facilitates selection of collaborating partners, in accordance with an embodiment. Computer system 800 can be an example of a specialized computer system that provides partner selection functionality in some implementations. In one embodiment, computer system 800 includes a processor 802, a memory 804, and a storage device 806. Storage device 806 stores a number of applications, such as applications 810 and 812 and operating system 816. Storage device 806 also stores components of partner selection system 100, which includes protocol execution module 702, a benefit estimation module 704, security log data 706, a merging module 708, a list of IP addresses 710, a blocking/filtering/examination module 712, and a distributed assignment module 714. During operation, one or more applications, such as protocol execution module 702, are loaded from storage device 806 into memory 804 and then executed by processor 802. While executing the program, processor 802 performs the aforementioned functions. Computer and communication system 800 may be coupled to an optional display 817, keyboard 818, and pointing device 820.

FIG. 9 illustrates an exemplary computer system 900 for a central authority that facilitates selection of collaborating partners, in accordance with an embodiment. Computer system 900 can be an example of a specialized computer system for a central authority that provides partner selection functionality. In one embodiment, computer system 900 includes a processor 902, a memory 904, and a storage device 906. Storage device 906 stores a number of applications, such as applications 910 and 912 and operating system 916. Storage device 906 also stores components of partner selection system 100, which includes central authority partner assignment module 922 and central authority-organization communication module 924. Central authority partner assignment module 922 performs the techniques disclosed herein for the central authority 114. Central authority-organization communication module 924 sends and receives data with organizations 102-110. During operation, one or more applications, such as central authority partner assignment module 922, are loaded from storage device 906 into memory 904 and then executed by processor 902. While executing the program, processor 902 performs the aforementioned functions. Computer and communication system 900 may be coupled to an optional display 917, keyboard 918, and pointing device 920.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A centralized method for stable selection of collaborating organizations for exchanging security log data, the method comprising:
   receiving, at a central server, a set of similarity metric values computed by a computing device of each organization in a plurality of organizations, wherein a similarity metric value is a measure of similarity between two sets of data and each set of data is associated with a respective organization;

receiving a number from each organization indicating a target number of organizations for exchanging security log data;

generating a list of organizations for each organization;

determining whether a respective number of organizations in the list generated for each organization equals a respective target number received from the organization;

in response to determining that a number of organizations in at least one list does not equal the respective target number received from the respective organization, instructing all organizations to perform a distributed assignment process which allows the respective organization to generate a respective self-generated list of organizations with highest similarity metric values for exchanging security log data; and in response to determining that, for all of the organizations, the respective number of organizations in the list generated for each organization equals the respective target number received from the organization, sending a respective list of organizations to the computing device of each organization, thereby allowing the computing device of a respective organization to exchange security log data with computing devices of other organizations from the respective list.

2. The method of claim 1, further comprising:

determining one or more matching organizations for exchanging security data by solving max $c^T x$ for x, such that $Ax \leq b$, wherein $x_i \in \{0,1\}, x=[x_i]$, for i=1, . . . , N, c=[1, . . . , 1], b=[$k_1$, . . . , $k_N$], A=[$v_{i,j}$] for i=1, . . . , N and j=1, . . . , N, wherein c is a vector with all elements equal to the number 1, b is a vector containing the target number of organizations to exchange security log data with for each organization in N organizations, A is a set of vectors containing similarity metric values $v_{i,j}$, and x is a vector indicating a set of organizations selected for a particular organization; and returning vector x to the plurality of organizations.

3. The method of claim 1, further comprising:

communicating instructions to all organizations to perform distributed assignment, wherein the organizations each determine one or more matching organizations for exchanging security data by solving max $\Sigma_{i=1}^{N} v_i x_i$ for $x_i$, such that $\Sigma_{i=1}^{N} x_i \leq k_j$, wherein $x_i \in \{0,1\}$, $v_i$ is an element in a vector v of similarity metric values, x is a vector representing selected organizations, $k_j$ is a target number of organizations for each organization j, N is the number of organizations, and wherein the solution involves:

sorting elements in vector v in descending order; and selecting top $k_j$ entries of the sorted vector v to add to a list of organizations for the organization j.

4. The method of claim 1, further comprising:

repeatedly adding organizations to an organization's list of organizations until the organization's list of organizations has reached a predetermined number of organizations.

5. The method of claim 1, further comprising:

removing a similarity metric value of an organization from a vector of similarity metric values after adding the organization to a respective list of organizations.

6. The method of claim 1, further comprising:

sending a corresponding list of organizations to each organization of the plurality of organizations.

7. A non-transitory computer-readable storage medium storing instructions that when executed by a computer cause the computer to perform a centralized method for stable selection of collaborating organizations for exchanging security log data, comprising:

receiving, at a central server, a set of similarity metric values computed by a computing device of each organization in a plurality of organizations, wherein a similarity metric value is a measure of similarity between two sets of data and each set of data is associated with a respective organization;

receiving a number from each organization indicating a desired target number of organizations for exchanging security log data;

generating a list of organizations for each organization;

determining whether a respective number of organizations in the list generated for each organization equals a respective target number received from the organization;

in response to determining that the number of organizations in at least one list does not equal the respective target number received from the respective organization, instructing all organizations to perform a distributed assignment process which allows the respective organization to generate a respective self-generated list of organizations with highest similarity metric values for exchanging security log data; and in response to determining that, for all of the organizations, the respective number of organizations in the list generated for each organization equals the respective target number received from the organization, sending a respective list of organizations to the computing device of each organization, thereby allowing the computing device of a respective organization to exchange security log data with computing devices of other organizations from the respective list.

8. The non-transitory computer-readable storage medium of claim 7, wherein the method further comprises:

determining one or more matching organizations for exchanging security data by solving max $c^T x$ for x, such that $Ax \leq b$, wherein $x_i \in \{0,1\}, x=[x_i]$, for i=1, . . . , N, c=[1, . . . , 1], b=[$k_1$, . . . , $k_N$], A=[$v_{i,j}$] for i=1, . . . , N and j=1, . . . , N, wherein c is a vector with all elements equal to the number 1, b is a vector containing the target number of organizations to exchange security log data with for each organization in N organizations, A is a set of vectors containing similarity metric values $v_{i,j}$, and x is a vector indicating a set of organizations selected for a particular organization; and returning vector x to the plurality of organizations.

9. The non-transitory computer-readable storage medium of claim 7, wherein the method further comprises:

communicating instructions to all organizations to perform distributed assignment, wherein the organizations each determine one or more matching organizations for exchanging security data by solving max $\Sigma_{i=1}^{N} v_i x_i$ for $x_i$, such that $\Sigma_{i=1}^{N} x_i \geq k_j$, wherein $x_i \in \{0,1\}$, $v_i$ is an element in a vector v of similarity metric values, x is a vector representing selected organizations, $k_j$ is a target number of organizations for each organization j, N is the number of organizations, and wherein the solution involves:

sorting elements in vector v in descending order; and selecting top $k_j$ entries of the sorted vector v to add to a list of organizations for the organization j.

10. The non-transitory computer-readable storage medium of claim 7, wherein the method further comprises:

repeatedly adding organizations to an organization's list of organizations until the organization's list of organizations has reached a predetermined number of organizations.

11. The non-transitory computer-readable storage medium of claim 7, wherein the method further comprises:

removing a similarity metric value of an organization from a vector of similarity metric values after adding the organization to a respective list of organizations.

12. The non-transitory computer-readable storage medium of claim 7, wherein the method further comprises:

sending a corresponding list of organizations to each organization of the plurality of organizations.

13. A computing system for stable selection of collaborating organizations for exchanging security log data, the system comprising:

one or more processors;

a memory; and a non-transitory computer-readable storage medium coupled to the one or more processors having instructions stored thereon that, when executed by the one or more processors, cause the one or more processors to perform operations comprising:

receiving, at a central server, a set of similarity metric values computed by a computing device of each organization in a plurality of organizations, wherein a similarity metric value is a measure of similarity between two sets of data and each set of data is associated with a respective organization;

receiving a number from each organization indicating a target number of organizations for exchanging security log data;

generating a list of organizations for each organization;

determining whether a respective number of organizations in the list generated for each organization equals a respective target number received from the organization;

in response to determining that a number of organizations in at least one list does not equal the respective target number received from the respective organization, instructing all organizations to perform a distributed assignment process which allows the respective organization to generate a respective self-generated list of organizations with highest similarity metric values for exchanging security log data; and in response to determining that, for all of the organizations, the respective number of organizations in the list generated for each organization equals the respective target number received from the organization, sending a respective list of organizations to the computing device of each organization, thereby allowing the computing device of a respective organization to exchange security log data with computing devices of other organizations from the respective list.

14. The computing system of claim 13, wherein the operations further comprise:

determining one or more matching organizations for exchanging security data by solving max $c^T x$ for x, such that $Ax \le b$, wherein $x_i \in \{0,1\}, x=[x_i]$, for i=1, ..., N, c=[1, ..., 1], b=[$k_1$, ..., $k_N$], A=[$v_{i,j}$] for i=1, ..., N and j=1, ..., N, wherein c is a vector with all elements equal to the number 1, b is a vector containing the target number of organizations to exchange security located with for each organization in N organizations, A is a set of vectors containing similarity metric values $v_{i,j}$, and x is a vector indicating a set of organizations selected for a particular organization; and returning vector x to the plurality of organizations.

15. The computing system of claim 13, wherein the operations further comprise:

communicating instructions to all organizations to perform distributed assignment, wherein the organizations each determine one or more matching organizations for exchanging security data by solving max $\Sigma_{i=1}^{N} v_i x_i$ for $x_i$, such that $\Sigma_{i=1}^{N} x_i \le k_j$, wherein $x_i \in \{0,1\}$, $v_i$ is an element in a vector v of similarity metric values, x is a vector representing selected organizations, $k_j$ is a target number of organizations for each organization j, N is the number of organizations, and wherein the solution involves:

sorting elements in vector v in descending order; and selecting top $k_j$ entries of the sorted vector v to add to a list of organizations for the organization j.

16. The method of claim 1, wherein the computing device is a network routing device.

17. The method of claim 1, wherein each respective similarity metric value is generated through a protocol between two organizations that reveals only a scoring number indicating a quantity of matching data which is common to the two organizations and maintains secrecy of non-matching data.

18. The method of claim 1, wherein the similarity metric value is determined based on a private set intersection computation which indicates the similarity between the two sets of data.

19. The method of claim 1, wherein the computing device blocks traffic originating from one or more IP addresses that are indicated in security log data obtained through exchange of security log data with a collaborating organization.

* * * * *